United States Patent
Kessler et al.

[11] 3,790,281
[45] Feb. 5, 1974

[54] COMBINED SYSTEM FOR ACOUSTICAL-OPTICAL MICROSCOPY

[75] Inventors: Lawrence W. Kessler, Glenview; Adrianus Korpel, Prospect Heights, both of Ill.

[73] Assignee: Zenith Radio Corporation, Chicago, Ill.

[22] Filed: Feb. 26, 1973

[21] Appl. No.: 335,854

[52] U.S. Cl............. 356/72, 73/67.5 R, 73/67.5 H, 340/5 H, 340/5 MP, 350/3.5
[51] Int. Cl............................................ H04b 11/00
[58] Field of Search......350/3.5; 356/72; 340/5 H, 356/5 MP; 73/67.5 R, 67.5 H

[56] References Cited
UNITED STATES PATENTS
| | | | |
|---|---|---|---|
| 3,564,904 | 2/1971 | Brenden et al. | 340/5 H X |
| 3,585,848 | 6/1971 | Korpel | 340/5 H X |
| 3,745,812 | 7/1973 | Korpel | 340/5 H X |

Primary Examiner—Ronald L. Wibert
Assistant Examiner—F. L. Evans
Attorney, Agent, or Firm—John J. Pederson et al.

[57] ABSTRACT

A combined acoustical-optical inspection system, operating at microscopic levels, in which an object to be studied is immersed in water or other sonic fluid propagation medium in close proximity to a partially-metallized semi-reflective mirror formed on an elastically deformable interface surface of a faceplate that engages the sonic propagation medium. The object is insonified with high-frequency acoustic energy, preferably at 100 MHz or more, from the side opposite the interface surface, producing a ripple pattern on the interface surface representative of the acoustic properties of the object. The object is scanned with a laser beam, through the interface; a reflected fraction of the beam is utilized to develop an acoustic image of the object and a transmitted fraction of the beam is employed to develop a precisely correlated optical image of the object. The two images may be superimposed for interpretation purposes.

15 Claims, 7 Drawing Figures

COMBINED SYSTEM FOR ACOUSTICAL-OPTICAL MICROSCOPY

BACKGROUND OF THE INVENTION

Historically, the development of a new technique of microscopy has alway added some new dimension of information to existing knowledge. Thus, the phase contrast microscope opened up the study of transparent objects, the electron microscope gave access to superfine structure, and the scanning electron beam microscope added a three-dimensional aspect. The recently developed technique of acoustic microscopy is likely to produce a similar dimensional breakthrough, although the precise nature of the new dimension of information to be attained by this technique is difficult to specify at the present time. Clearly, acoustic microscopy can and will reveal details of mechanical structure, such as bonding, polymerization, elasticity, density, and viscosity, in contrast with the electronic structure that is indirectly observed by the optical microscope.

On the other hand, many optical and mechanical properties are intimately coupled. Thus, it may well be that in many cases the new dimension of acoustic microscopy will be more quantitative than qualitative in nature. Frequency, the quantitative difference between optical and acoustic properties is very pronounced. For instance, whereas the optical reflection from a water-to-air interface amounts to no more than two percent, the acoustic reflection is virtually total. Thus, in at least many instances precisely correlated acoustical and optical microscopic images of the same object may provide total information pertaining to the object that substantially exceeds the information available from one of the images alone.

Obtaining the total information that should be available from microscopic inspection of an object on both an acoustical and optical basis, however, is quite difficult. Using independent microscope equipment to obtain the two images, it is almost impossible to obtain exactly the same magnification of exactly the same portions of any particular specimen. This is particularly true in those systems that utilize an oscilloscope, a television monitor, or other similar oscilloscopic apparatus for image reproduction, since the image reproducer almost inevitably introduces some limited distortion into the image.

Accordingly, there is a substantial need to provide an effective microscopic inspection system that combines the techniques of acoustical and optical microscopy to generate directly and precisely correlated acoustical and optical images of the same object. Furthermore, the total information developed by a system of this nature is clearly maximized if provision is made for examination of the acoustical and optical image independently of each other as well as in combined form.

SUMMARY OF THE INVENTION

It is a principal object of the invention, therefore, to provide new and improved comparative inspection system for acoustical and optical examination of an object, on a microscopic level, that generates inherently correlated visual representations of both the acoustical and optical properties of the object.

A more specific object of the invention is to provide a new and improved microscopic inspection system for correlated acoustical and optical examination of an object that utilizes a single scanning beam, preferably a laser beam, in the generation of both the acoustical and optical images.

Another object of the invention is to provide a new and improved microscopic comparison system, producing correlated acoustical and optical images of a single object, that is effectively and inherently adapted to acoustical scanning at very high frequencies ranging upwardly from 100 MHz.

An important object of the invention is to provide a new and improved method and apparatus for generating a true simultaneous and composite image, on a microscopic level, of both the optical and acoustical properties of a given object under examination.

Accordingly, the invention relates to a comparative inspective system for correlated acoustical and optical examination of an object, on a microscopic level. The system comprises support means for supporting an object in engagement with a fluid sonic propagation medium, and boundary means defining an elastically deformable partially light-reflective interface surface disposed adjacent the object and coupled to the object to generate on the interface surface a ripple pattern characteristic of the object. Insonification means are provided for insonifying the object with high frequency acoustic energy, preferably at a frequency of 100 MHz or more. The system further comprises optical scanning means, including illumination means for developing a high-energy light beam of small diameter and deflection means for deflecting that beam across the interface. A first fraction of the beam is reflected from the ripple pattern on the interface surface, angularly modulated in accordance with the acoustical properties of the object, and a second fraction of the beam is transmitted through the object, amplitude modulated in accordance with the optical properties of the object. First photodetection means receive the reflection fraction of the beam, developing a first electrical signal representative of an acoustical image of the object. Second photodetection means intercept the transmitted fraction of the beam, developing a second electrical signal representative of an optical image of the object. Imaging means, included in the system, utilize the first and second electrical signals to generate correlated visual representations of both the acoustical and optical images of the object.

DESCRIPTION OF THE PREFERRED EMBODIMENTS

Figure 1:
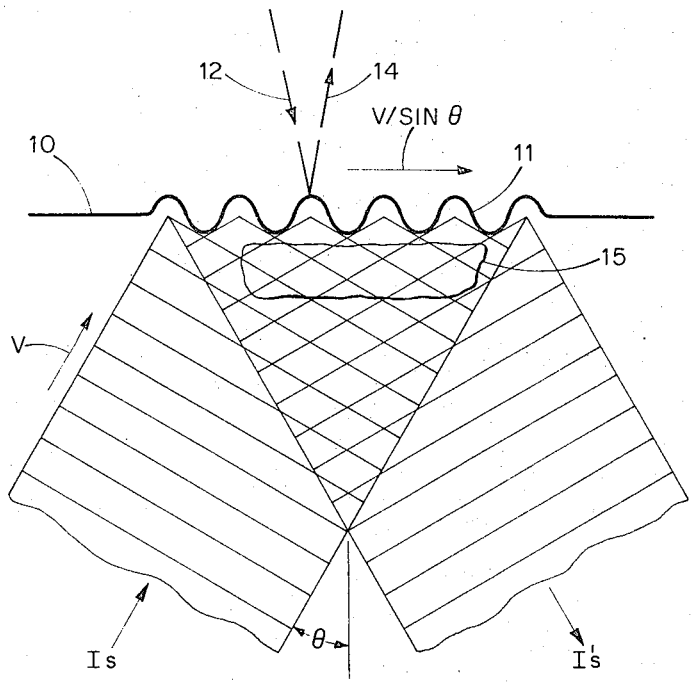
FIG. 1 is a diagram illustrating the effect of a sound wave impinging upon an elastically deformable interface of finite acoustical impedance.

The acoustical imaging apparatus incorporated in the comparative inspection systems of the present invention, as described hereinafter, utilizes, as a principle of operation, a distortion that occurs at an elastically deformable interface surface, having finite acoustic impedance, when the interface is subject to an incident acoustic wave. This phenomenon is illustrated schematically in FIG. 1, in which an elastically deformable interface 10 intercepts an incident plane wave $I_s$ having a velocity $V$, the angle of incidence being the angle $\theta$. The acoustic wave $I_s$ produces a ripple pattern 11 on surface 10. The pattern or boundary displacement 11 is dynamic, with fluctuation occurring at the acoustic frequency. The phase of the ripple pattern or displacement wave 11 propagates to the right, as seen in FIG. 1, with a velocity $V'$ of $V/\sin\theta$.

In practice, in one form of acoustical microscope, as described in "An Acoustic Microscope Operating at 100 MHz," Nature, Vol. 232, page 110 (1971), the interface 10 is formed by a plastic resin faceplate disposed on top of a sound cell filled with water, the water being utilized as a fluid sonic propagation medium. A resin faceplate is chosen because, in comparison with other solids, the acoustic impedance of the faceplate can be reasonably matched with that of the water. Furthermore, the resin is quite lossy, acoustically, so that the acoustic energy transmitted to the faceplate can be effectively propagated into semi-infinite space, thereby avoiding resonance effects. To detect the amplitude of the surface distortion represented by the ripple pattern or displacement wave 11, the interface 10 is made optically reflective by a metallic coating applied to the faceplate at the interface surface. The interface can then be illuminated with a focused laser beam, as indicated by the dashline 12, producing a reflected beam 14 which is angularly modulated by the changes in slope of the reflective interface surface caused by the propagation of the ripple pattern 11 across the surface. The reflected beam 14 can then be imaged onto a knife edge, in the manner discussed hereinafter in connection with FIG. 3, for conversion of the angular modulation into intensity modulation. The intensity modulated beam is intercepted by a suitable photodetection device, which develops an electrical signal coherent with the local sound pressure at interface 10.

An object 15 that is to be subjected to acoustical examination is placed just under the boundary 10. In this position, object 15 casts a sharply defined ripple pattern on interface 10 that is characteristic of the acoustic properties of object 15. Ordinarily, the specimen 15 is located as close as possible to boundary 10, since any substantial displacement may lead to blurring of the image. For inspection of an object of substantial thickness, or in other instances in which the plane of interest in the object cannot be located immediately adjacent boundary 10, the phase of the signal developed from the reflected beam 14 can be analyzed to produce an acoustic hologram of object 15; the hologram can subsequently be reconstructed optically in accordance with known techniques.

The overall response characteristic of the acoustic imaging system described briefly above, relative to FIG. 1, is a function of the angle $\theta$ of incidence the acoustic plane wave $I_s$. This characteristic determines the numerical aperture of the system and hence the system resolution, as governed by the relationship:

$$\Delta = (1/2\ L)/NA \tag{1}$$

In equation (1), $L$ is the acoustic wavelength, $NA$ denotes the numerical aperture of the system determined by the sine of half the apex angle of the cone of rays admitted by the imaging system, and $\Delta$ is the resolution of the system.

Figure 2:
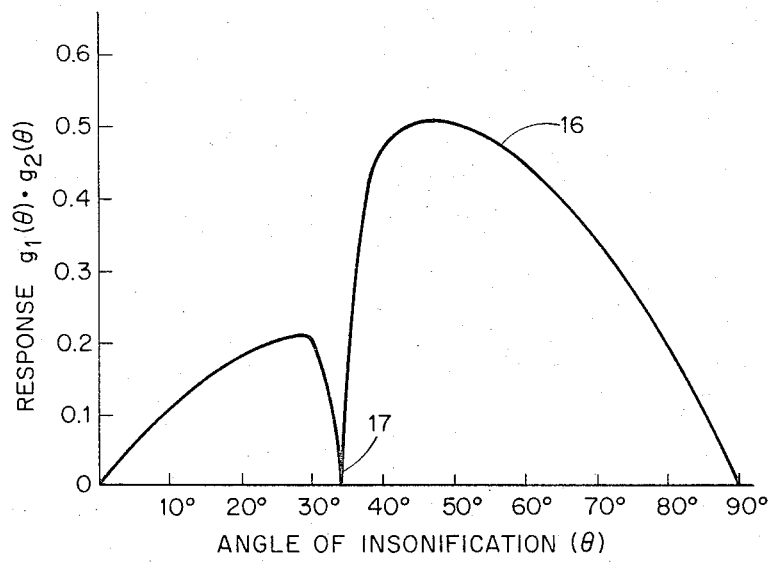
FIG. 2 is a chart of the response for a scanning light beam of particular spot size and wavelength for an interface between water and a specific deformable resin material.

FIG. 2 illustrates the response characteristic for a particular set of parameters as applied to the imaging arrangement schematically illustrated in FIG. 1. In FIG. 2, the system response is plotted as a function of the insonification angle $\theta$, the response being determined by the product of $g_1\theta \cdot g_2\theta$, where $g_1\theta$ is the normal displacement amplitude of the interface 10 (FIG. 1) and $g_2\theta$ represents the effect of the light beam diameter on the knife edge response. For FIG. 2, the solid line curve 16 indicates the response for an interface of water and polymethylmethacrylate with a wavelength $L$ of 15 microns and a scanning light beam spot size of 8.4 microns. As can be seen from curve 16, the disparity in the compressional wave velocities of the resin and the water give rise to a critical angle of approximately 34°, as indicated at point 17 on the curve. At this angle the acoustic impedance of interface 10 appears to be infinite and, accordingly, no displacement pattern 11 (FIG. 1) is developed. Thus, for these particular materials and parameters, the angular aperture is restricted to the region between 0° and 34° or to the region between 34° and 90°. With other materials, the critical angle has a different value. For example, for a water-polycarbonate interface, with other conditions similar, the critical angle is 43°.

It is thus apparent that for the acoustical microscope that is utilized in the present invention, as described in connection with FIG. 3, a change of materials for the resin faceplate affords different overall transfer characteristics. For an ideal condition, with no critical angle between 0° and 90°, it would be necessary to employ a faceplate whose characteristic acoustic propagation velocity for compressional waves is less than or equal to that of water, 1,500 meters per second. For polymethylmethacrylate, this velocity is 2,670 meters per second and for polycarbonate resin the velocity is 2,200 meters per second. For both materials the shear wave velocity is less than the compressional wave velocity in water, so that only one critical angle occurs between 0° and 90°. However, if a harder substance, such as glass, is employed for the faceplate, a second critical angle, caused by the shear wave, restricts the angular aperture even more.

Figure 3:
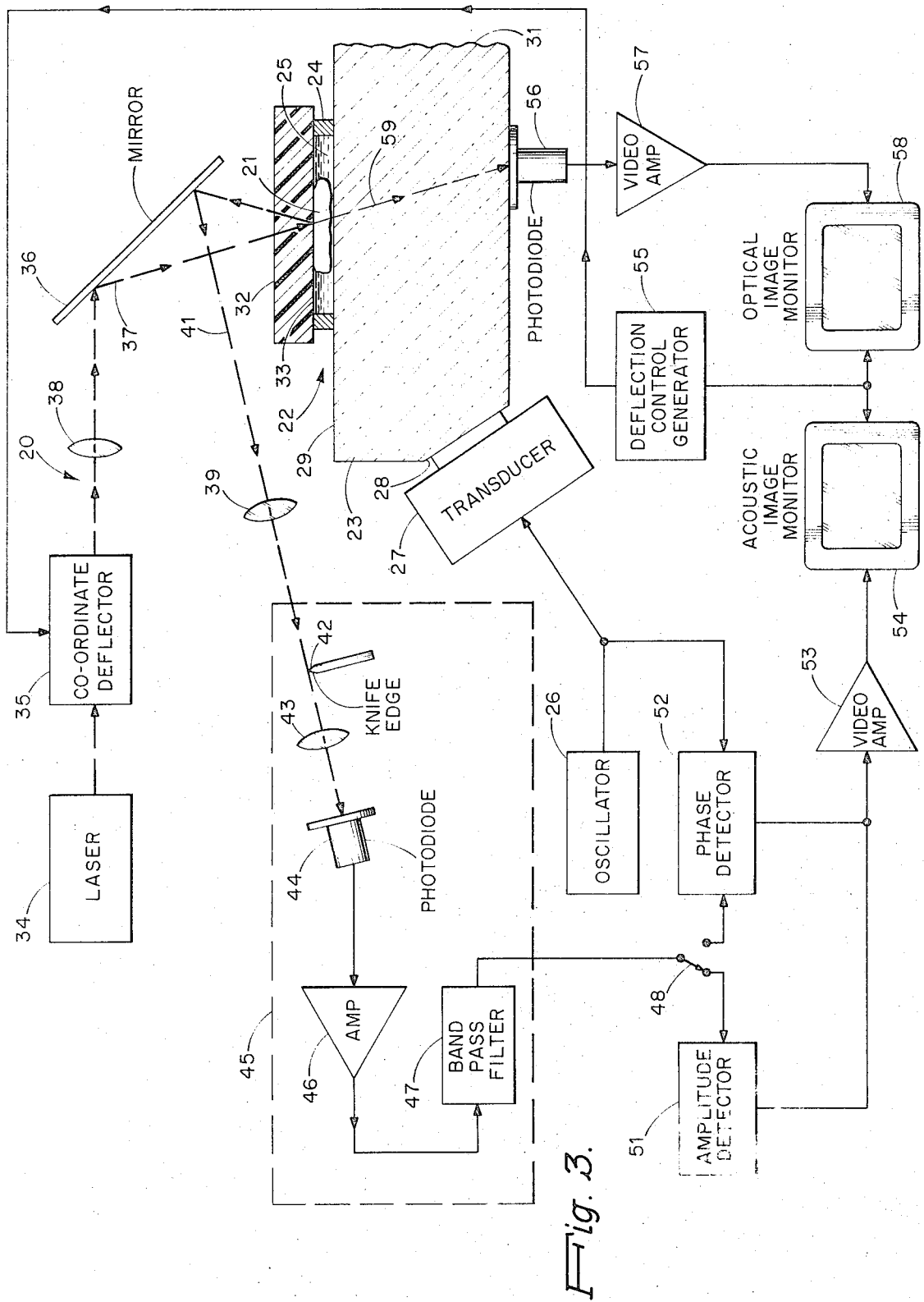
FIG. 3 is a block diagram of a comparative inspection system for correlated acoustical and optical examination of an object, constructed in accordance with one embodiment of the present invention.

FIG. 3 illustrates a comparative inspection system 20, constructed in accordance with one embodiment of the present invention, for correlated acoustical and optical examination of an object such as a specimen 21. System 20 comprises a sound cell 22, including a base member 23 formed from a material exhibiting extremely low acoustical loss. In the illustrated construction, base member 23 may be formed from fused quartz. The object to be examined, specimen 21, is supported on member 23 within an enclosure formed by a spacer 24. Specimen 21 is immersed in a fluid sonic propagation medium; in this instance, the sonic propagation medium 25 is water.

System 20 includes insonification means for insonifying the object under examination, specimen 21, with high frequency acoustic energy. The insonification means is a high-frequency oscillator 26 having its output coupled to an electro-acoustic transducer 27 mounted on an angled surface 28 of base member 23 in sound cell 22. The angular relation of surface 28 to the support surface 29 of base member 23 is such that the acoustic plane wave developed in base member 23 by operation of transducer 27 impinges upon object 21 at a suitable angle of incidence, as determined by the operating characteristic of the sound cell, discussed above in conjunction with FIGS. 1 and 2. The end 31 of base member 23 opposite surface 28 is of irregular configuration, affording a sound scattering boundary.

Inspection system 20 further comprises boundary means defining an elastically deformable, partially light-reflective interface surface that is disposed adjacent to the object under inspection, specimen 21, and that is coupled to object 21 by the fluid sonic propagation medium 25. This boundary means comprises a faceplate 32 formed of a resin material, which may be polymethylmethacrylate or polycarbonate, as indicated above. Faceplate 32 must be at least partially transparent. The interface surface 33 of faceplate 32 is in engagement with the fluid propagation medium 25; surface 33 is coated with a thin vacuum-deposited metal coating or is otherwise treated to be partially light-reflective.

Optical scanning means are incorporated in system 20 to develop a high-energy light beam of small diameter and to deflect that beam across interface surface 33 in a regular scanning pattern. The optical scanning means comprises a laser 34 which generates a phase-coherent light beam. The beam from laser 34 passes through a coordinate deflector 35 and impinges upon a mirror 36 that directs the beam along a path 37 through faceplate 32 and onto interface surface 33 in the region immediately above object 21. Deflector 35 may comprise a pair of acoustical-optical light deflector cells of the kind described in "A Television Display Using Acoustical Deflection and Modulation of Coherent Light," Applied Optics, Volume 5, Page 1,667 (1966).

Mirror 36 intercepts a first fraction of beam 37 that is reflected from interface surface 33 and directs the reflected fraction of the beam along a path 41. A lens 39, positioned on path 41, forms a 1:1 telescope with a lens 38 that is interposed in the path of the original beam between deflector 35 and mirror 36. The telescope formed by lenses 38 and 39 images the exit pupil of deflector 35 onto a knife edge 42. Knife edge 42 is positioned to block one-half of the reflected fraction 41 on the light beam.

Knife edge 42 is incorporated in a first photodetection means 45 for receiving the reflected fraction 41 of the light beam and developing a first electrical signal representative of an acoustical image of object 21. The first photodetection means 45 further comprises a lens 43 and a photodiode 44, photodiode 44 being positioned to intercept the reflected fraction 41 of the light beam fter it has passed knife edge 42 Photodiode 44 is electrically connected to the input of an amplifier 46.

The output of amplifier 46 is coupled to the input of a bandpass filter 47 to limit the noise.

The output of bandpass filter 47 is connected to a switch 48; switch 48 is a single-pole double-throw switch, having two output terminals which are connected, respectively, to the input of an amplitude detector 51 and to the input of a phase detector 52. The output of detector 51 is connected to the input of a video amplifier 53. Phase detector 52 has a second input derived from the output of oscillator 26; the output of detector 52 is connected to the input of amplifier 53. The output of amplifier 53 is applied to a first image reproducer 54, comprising a television monitor or other oscilloscope image-reproducing device. Image reproducer 54, sometimes referred to herein as the acoustic image monitor, also receives a deflection control signal from a deflection signal generator 55. The deflection control generator 55 is also coupled to the light beam coordinate deflector 35 to maintain synchronism between deflection of the light beam and of the image reproducing electron beam in the image monitor.

A part of the incident light beam 37 passes through the semi-reflected interface surface 33 and through base member 23. This transmitted fraction 59 of the light beam is intercepted by a photodiode 56 mounted on the bottom of support member 23. Photodiode 56 is electrically coupled to the input of a video amplifier 57. The output of video amplifier 57 is connected to the video input of a second image reproducing device 58. Image reproducer 58, like monitor 54, is a television monitor or other oscilloscope image reproducer, essentially identical in construction to image reproducer 54. A deflection control input for image reproducer 58, sometimes referred to as the optical image monitor, is derived from deflection control generator 55 to maintain monitor 58 in synchronism with the operation of monitor 54 and light beam deflector 35.

A useful starting point, in considering the operation of inspection system 20, is sound cell 22. The basic function of the sound cell is to couple acoustic energy to the object to be examined, specimen 21, at the desired angle of insonification, while mechanically supporting the specimen in close proximity to the interface surface 33 of faceplate 32. In sound cell 22, the high acoustic losses than can be occasioned by propagation of acoustic energy through a long path in a relatively lossy medium are effectively eliminated by utilization of the base member 23, formed of fused quartz. The high acoustic velocity in the quartz support member 23, (6,000 meters per second) compared to the acoustic velocity in the fluid propagation medium 25 (1,500 meters per second for water) caused a substantial refraction at the interface between the quartz and the water, at surface 29. In sound cell 22, therefore, the sonic beam from transducer 27 is refracted from the solid into the fluid at a relatively narrow angle, in this instance 10°. The transmitted sound intensity is about 10 db below that of the incident acoustic beam; the remaining sound is scattered and absorbed within the fused quartz block, support member 23.

Laser 34 develops a phase-coherent high intensity light beam of small diameter which scans a predetermined portion of specimen 21 in a regular scanning pattern controlled by the deflection control generator 55 and optical deflector 35. A first fraction 41 of the incident beam 37 is reflected from the ripple pattern on the interface surface 33 and impinges upon knife edge 42. The telescope arrangement comprising lenses 38 and 39 maintains the position of the reflected fraction 41 of the light beam, impinging upon knife edge 42, essentially independent of the instantaneous scanning angle. Instead, the light beam position depends only upon the surface distortion produced at interface 33, this surface distortion constituting a ripple pattern that is characteristic of specimen 21.

As the reflected fraction 41 of the light beam changes its position slightly with respect to knife edge 42, in accordance with the acoustical pattern of the object, the overall intensity of the portion of the beam that reaches photodiode 44 changes. Thus, the electrical signal developed by photodiode 44, which is coherent with the local sound pressure, is amplified, filtered and detected, and is applied to the acoustic image monitor 54, through circuits 46, 47, 51 and 53. A synchronized image is developed on monitor 54, since the deflection control for monitor 54 is derived from the same source 55 that controls the optical deflector 35.

In the operation of the acoustical microscope portion of system 20, as described immediately above, the response characteristic illustrated in FIG. 2 is applicable. However, this response characteristic can be modified optically or by electronic filtering. Electronic modification is possible because the laser probe, scanning over the moving ripple pattern upon interface surface 33, creates a Doppler shift in the signal output, from the sound frequency, in accordance with the equation:

$$f_d = V_s/L \sin \theta$$

(2)

In equation (2), $V_s$ is the linear velocity of the scanning light beam 37 across the interface surface 33 and $L/\sin \theta$ is the wavelength of the ripple pattern on the interface surface; $f_d$ is the amount of the Doppler shift. From equation (2), it is seen that spatial frequencies are translated into temporal frequency changes which can be processed electrically. Electronic filtering is especially important in restricting the angular response to one side of normal incidence, eliminating phase reversals which otherwise may severely distort the acoustical image and produce false image detail.

The sensitivity of the acoustical microscope incorporated in system 20 is governed by several parameters, such as laser power, observation time, detector efficiency, choice of face plate material, and others. For an acoustic frequency of 100 MHz, using a frame time in acoustical monitor 54 of 1/30 second, sensitivities of approximately $10^{-3}$ watts per square centimeter have been obtained. In this system, operating at 100 MHz, resolution of 1.3 wavelengths of sound have been effected corresponding to a resolution of 20 microns with a sound wavelength of 15 microns in water. Much higher resolution can be obtained at higher frequencies; thus, at a sonic frequency of 1 GHz, a resolution of 2 microns can be expected.

The optical microscope incorporated in system 20 utilizes the transmitted fraction 59 of the original laser beam 37 that passes through object 21. Optical resolution is determined primarily by the diameter of the light beam. The scanning of the optical image monitor 58 is coordinated with that of the optical deflector 35, since deflection in both is controlled from the same deflection signal generator 55. The optical image reproduced on monitor 58 and the acoustic image reproduced on monitor 54 are inherently correlated with each other, covering the same portion of specimen 21 in each instance. Because the optical and acoustic images are reproduced simultaneously from different fractions of the same incident light beam, it is a relatively simple matter to adjust the two image monitors to minimize distortion differences and to assure equality in the magnification ratios of the acoustical and optical images, so that substantially exact registry is possible.

To develop an acoustical hologram of specimen 21, switch 48 is actuated from the position shown in FIG. 3 to the alternate position in which the output of bandpass filter 47 is applied to phase detector 52 instead of amplitude detector 51. This results in the generation of a series of lines of equal phase contour in the image developed on acoustic monitor 54. The resultant hologram can be reconstructed, using known optical techniques, to afford better visualization of the out-of-focus portions of the specimen 21.

System 20 (FIG. 3) allows direct, side-by-side comparison of two simultaneously generated, directly correlated visual representations of the acoustical and optical images of the object under examination, specimen 21. The two images can be compared directly by the user of the system, the detail in one image aiding in interpretation of detail pertaining to the same portion of the specimen that appears in the other image. On the other hand, in a given application, it may be desirable to superimpose the two images on each other, directly, without the necessity of taking photographs for subsequent processing. One modification of system 20 (FIG. 3) which provides for simultaneous imaging on both an acoustical basis and an optical basis is illustrated in FIG. 4.

Figure 4:
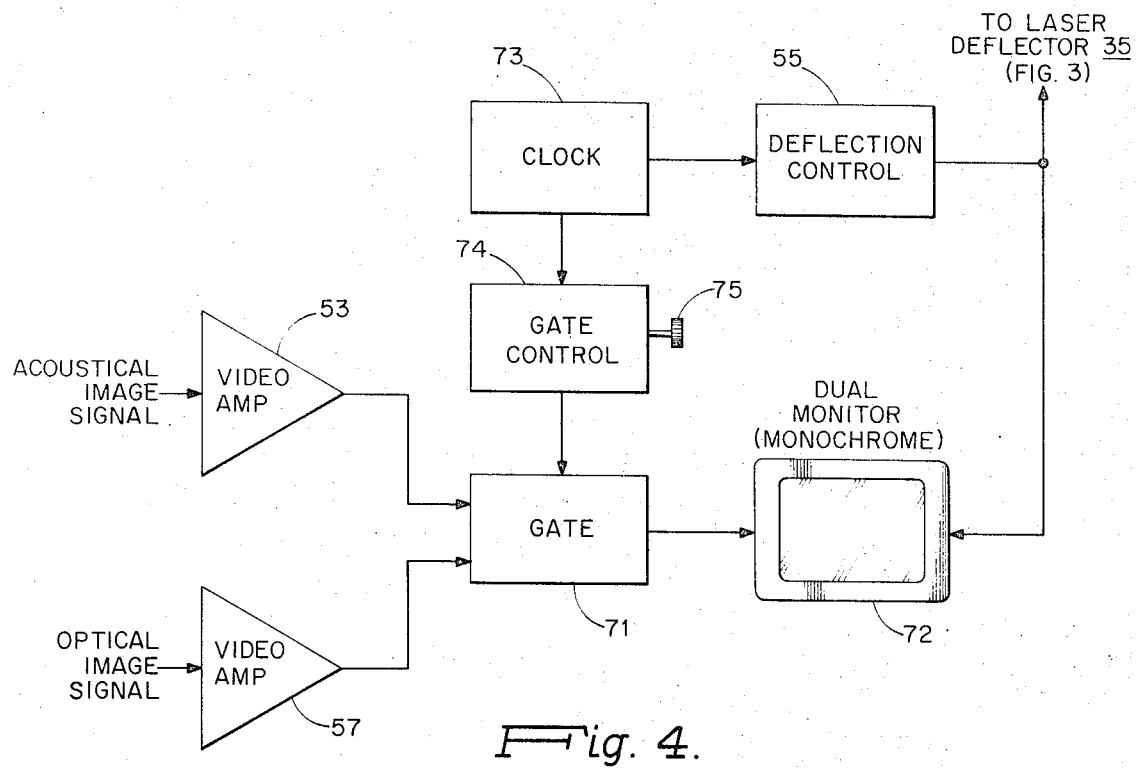
FIG. 4 is a block diagram of a modification of the inspection system of FIG. 3.

In the system modification illustrated in FIG. 4, the acoustic image monitor 54 and the optical image monitor 58 of FIG. 3 are replaced by a single image reproducer 72 that functions as a dual monitor for both acoustic and optic images. As in the intially described system, monitor 72 may comprise a television receiver of substantially conventional construction or other suitable image reproducing apparatus.

In FIG. 4, the video amplifier 53 for the acoustical image signal is coupled to one input of a gate circuit 71. The output of the optical image video amplifier 57 is connected to a second input for gate 71. Gate 71 is an electronic switching circuit having its output connected to the video circuits of the dual monitor 72. Gate 71 is actuatable between a first condition in which the acoustical image signal from amplifier 53 is supplied to monitor 72 an a second condition in which the optical image video signal from amplifier 57 is applied to monitor 72.

Gate 71 has a control input that is connected to the output of a gate control circuit 74. Gate control circuit 74 has an input derived from a clock signal source 73; clock 73 is also coupled to and serves as a frequency-determining circuit for deflection control 55. As in the previously described system, the output of deflection control circuit 55 is connected to monitor 72 to control the scanning circuits of the image reproducer and is also connected to the coordinate deflector 45 for the laser beam scanner (see FIG. 3). Gate control 74 is also provided with a manual control 75.

In considering the operation of system 20 as modified to include the monitoring apparatus shown in FIG. 4, it may first be assumed that gate 71 is actuated to its first operating condition, in which the acoustic image signal from video amplifier 53 is supplied to the video circuits of image monitor 72. This operating condition may be maintained on a continuous basis by gate control 74, actuated by the manual control 75. For this condition, monitor 72 provides an acoustical image of the object under study (object 21, FIG. 3), the same image that would be displayed on the acoustic image monitor 54 in the system as initially described. Thus, the system modification shown in FIG. 4 allows the operator to observe the acoustical microscope image, independently of any optical image, by appropriate action of gate control 74.

To study the optical image represented by the video signal from amplifier 57, manual control 75 is actuated to cause gate control 74 to supply a signal to gate 71 that maintains gate 71 in its second operating condition. In this operating condition, the optical image is continuously presented on monitor 72, affording the same information that would have been provided on optical image monitor 58 in the original system (FIG. 3).

For simultaneous presentation of both the acoustical image and the optical image on monitor 72, gate control 74 is actuated, by control member 75, to couple clock 73 to gate 71. Clock 73 provides an actuating signal having a frequency equal to the frame rate for operation of monitor 72, synchronism being maintained because deflection control 55 is also actuated from clock 73. For this operating condition of the modified apparatus illustrated in FIG. 4, the acoustical an optical images are reproduced on monitor 72 in alternate scanning frames. With a reasonably high frame rate, the visual persistance of the observer provides for effective viewing of a composite of the acoustical and optical images of the object under study. Because the two images are developed from a single scanning laser beam (FIG. 3), and because the two image signals are reproduced on the same monitor 72 (FIG. 4), any distortion introduced by the monitor applies equally to the two images. Consequently, the images are inherently and exactly correlated and afford a truly simultaneous view of both the optical and acoustical characteristics of the object.

Figure 5:
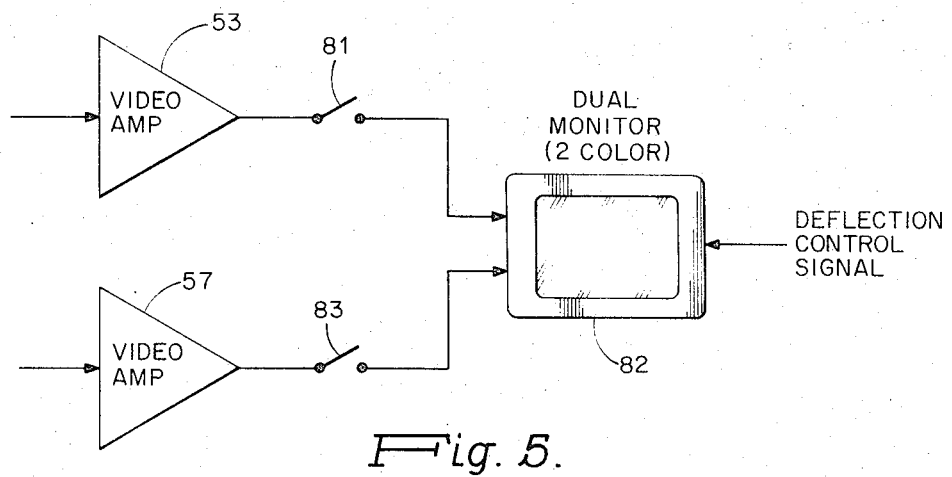
FIG. 5 is a block diagram of another modification of the inspection system of FIG. 3.

The modified imaging apparatus illustrated in FIG. 4, as noted above, affords a truly simultaneous image of the object in terms of both optical and acoustical properties. However, the combined image, being reproduced in a single color, may present some difficulty for the observer in interpretation of individual image elements. FIG. 5 illustrates a further modification of the imaging system in which the observer can always distinguish the optical elements of the image from acoustical elements.

The imaging apparatus illustrated in FIG. 5 utilizes a single monitor 82 for display of both the acoustical and optical images of the object under inspection. In this instance, the monitor comprises a two-color television image reproducer. The video circuits of the two-color monitor 82 pertaining to one color are coupled to the output of the acoustical image video amplifier 53 through a switch 81. Similarly, the output of the optical image video amplifier 57 is coupled to the video control circuits of monitor 82 for a second color through a switch 83. The deflection control for monitor 82 is the same as in FIG. 3, being derived from the deflection control generator 55 (FIG. 3).

To view only the acoustical image of the object under inspection, using the imaging apparatus of FIG. 5, independently of any optical image, switch 81 is closed and switch 83 is left open. For these conditions, the image developed by the acoustical microscope incorporated in the system is reproduced in a given color on the image screen of monitor 82. By way of example, the acoustical image may be reproduced in red. Conversely, if switch 83 is closed and switch 81 is left open, the optical image of the object is reproduced on the image screen of monitor 82 in a second color which may, for example, be green. For this operationg condition, the observer sees only the optical image, independently of any acoustical image data.

For simultaneous viewing of both the acoustical and optical images of the object, using the system modification illustrated in FIG. 5, switches 81 and 83 are both closed. For this condition, the two images are developed simultaneously, on the image screen of monitor 82, but in two different colors. This arrangement not only affords the observer a precisely registered pair of optical and acoustical images, but also enables ready distinction of the one image from the other because the two images are developed in different colors.

Figure 6:
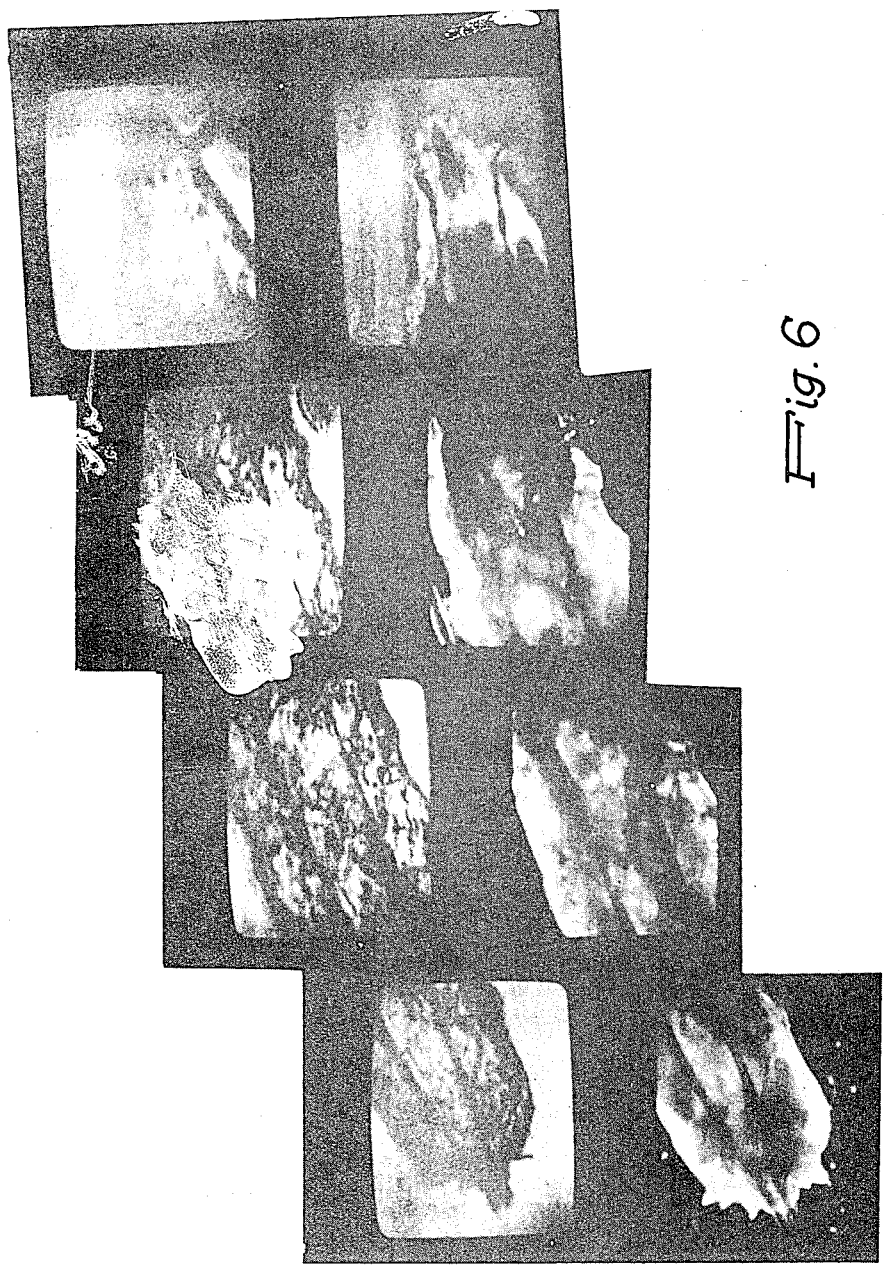
FIG. 6 is a reproduction of the optical and acoustical images developed by the system of FIG. 3 in inspection of a particular biological specimen.

FIG. 6 illustrates the acoustical and optical images of a living fruit fly larva (*drosophila melanogaster*) developed by system 20 (FIG. 3); the optical images are disposed immediately above the corresponding acoustic images. The particular specimen under inspection is about 1 millimeter in diameter and approximately 4 millimeters in length. The monitors employed in producing these images each display an area of the object approximately 1.7 millimeters in width and approximately 1.2 millimeters in height. Because the larva was considerably longer than the uniform region of the sound field, it was necessary to image only a section of the larva at one time. For improved continuity, an overlap of approximately 40 percent has been provided in the images. The optical image in each instance is dark field, produced by a slight offsetting of photodiode 56 (FIG. 3) so as to avoid reception of unscattered light from the specimen.

There are several interesting features apparent in the images of the fruit fly larva reproduced in FIG. 6. Most of the fine line detail in the acoustical images represents the tracheal network of the larva, branching out from two main trachea 90 and 91 which run the length of the larva 90. This tracheal network is a system of tubes through which oxygen is delivered to the individual cells of the larva. The sharp reproduction of the trachea in the acoustical images results from the relatively large acoustic impedance mismatch between the air in the trachea and the surrounding tissue.

The head of the larva appears in the two images at the right-hand side of FIG. 6. The foremost dark structure, in both the acoustical and optical images, is the mouth armature 93. Approximately one-third of the length of the larva from the head end, almost centered in the second image from the right in FIG. 6, is an acoustically opaque region 94 approximately 200 microns in diameter. This appears to be the organ of the larva known as the proventriculus. This organ is a part of the digestive system of the larva. It is much more visible than other organs of the specimen because, unlike those other organs, it consists of a chitinous material.

Clearly, the acoustic impedance of this substance differs greatly from the impedance of the other surrounding tissue. It is noteworthy that this structure does not appear in the optical image, apparently as a result of the general masking caused by overall optical opacity in the region in which the organ is located.

Figure 7:
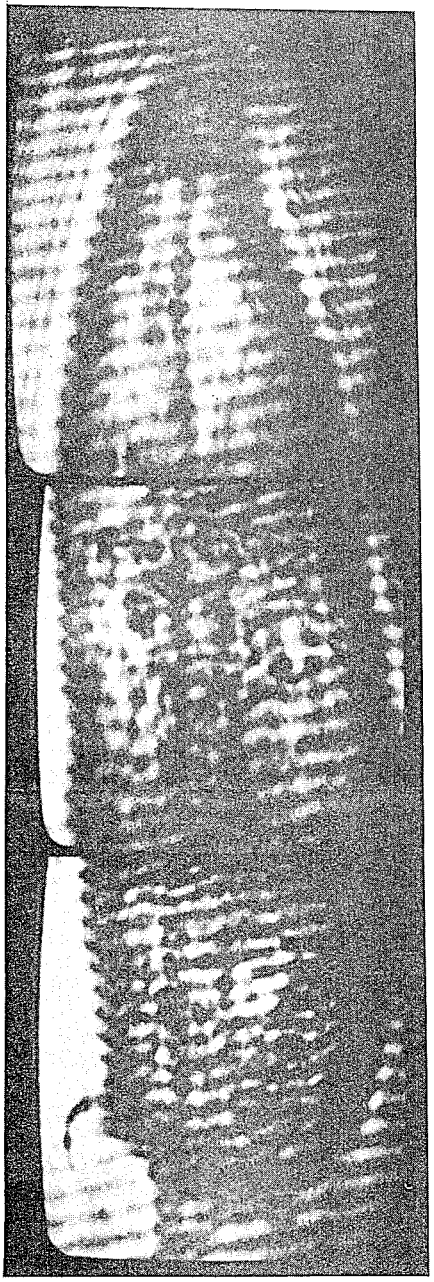
FIG. 7 is an acoustical hologram of another specimen, produced with the system of FIG. 3.

FIG. 7 is an acoustical hologram of another larva, made with the system illustrated in FIG. 3, utilizing phase detector 52 instead of amplitude detector 51. The composite image was pieced together from three acoustical images. In FIG. 7, the lines 95 represent equal phase contours. Out-of-focus regions of this specimen can be visualized by reconstruction of the hologram with coherent light in accordance with known techniques.

We claim:

1. A comparative inspection system for correlated acoustical and optical examination of an object, comprising:

support means for supporting an object in engagement with a fluid sonic propagation medium;

boundary means defining an elastically deformable partially light-reflective interface surface disposed adjacent to the object and coupled to the object by the medium, the boundary means reacting to acoustic vibration of the object to generate on the interface surface a ripple pattern characteristic of the object;

insonification means for insonifying the object with high frequency acoustic energy;

optical scanning means, including illumination means for developing a high-energy light beam of small diameter and deflection means for deflecting that beam across the interface, a first fraction of the beam being reflected from the ripple pattern on the interface surface, angularly modulated in accordance with the acoustical properties of the object, and a second fraction of the beam being transmitted through the object, amplitude modulated in accordance with the optical properties of the object;

first photodetection means for receiving the reflected fraction of the beam and developing a first electrical signal representative of an acoustical image of the object;

second photodetection means for receiving the transmitted fraction of the beam and developing a second electrical signal representative of an optical image of the object;

and imaging means utilizing the first and second electrical signals to generate correlated visual representations of the acoustical and optical images of the object.

2. A comparative acoustical-optical inspection system, according to claim 1, in which said illumination means comprises a laser which develops a phase-coherent light beam having a diameter, at the interface, of no more than 10 microns.

3. A comparative acoustical-optical inspection system, according to claim 1, in which the imaging means comprises an oscilloscopic display and means for applying both the first and second electrical signals to the display effectively to generate a composite image comprising superimposed simultaneous acoustical and optical images of the object.

4. A comparative acoustical-optical inspection system, according to claim 3, in which the display is a two-color display, and in which the acoustical image is presented in a first color and the optical image is presented in a second color.

5. A comparative acoustical-optical inspection system, according to claim 1, in which the imaging means comprises at least one oscilloscopic display, and further comprising deflection control means, coupled to both the optical scanning deflection means and to the display, for synchronizing scanning in the display with optical scanning of the object.

6. A comparative acoustical-optical inspection system, according to claim 1, in which the support means comprises a transparent base member having an acoustical impedance substantially greater than the acoustical impedance substantially greater than the acoustical impedance of the sonic propagation medium, upon which the object is supported, and in which the boundary means comprises a faceplate member having an acoustical impedance approximately matched to the acoustical impedance of the sonic propagation medium.

7. A comparative acoustical-optical inspection system, according to claim 6, in which the base member is formed of fused quartz.

8. A comparative acoustical-optical inspection system, according to claim 6, in which the faceplate member is formed of a transparent resin having an interface surface engaging the sonic propagation medium, and having a thin, partially transparent metallic coating on its interface surface.

9. A comparative acoustical-optical inspection system according to claim 8, in which the sonic propagation medium is water and the resin for the faceplate member is selected from the group consisting of polymethylmethacrylate and polycarbonate resins.

10. A comparative acoustical-optical inspection system, according to claim 1, in which the insonification means includes oscillator means, generating an electrical oscillation signal at a given frequency of at least 100 MHz, and electro-acoustic transducer means, coupled to the oscillator means and to the support means, for insonifying the object at said given frequency.

11. A comparative acoustical-optical inspection system, according to claim 10, in which the first photodetection means includes a photosensitive optical-electrical transducer positioned to intercept the reflected fraction of the light beam, and an amplitude detector coupled to the optical-electrical transducer, for generating an amplitude-modulated first electrical signal corresponding to the angular modulation of the reflected fraction of the light beam.

12. A comparative acoustical-optical inspection system, according to claim 10, in which the first photodetection means includes a photosensitive optical-electrical transducer positioned to intercept the reflected fraction of the light beam, and a phase detector, coupled to the optical-electrical transducer and to the oscillator, for generating an amplitude-modulated first electrical signal representative of angular modulation of the reflected fraction of the beam and of phase variations in the reflected fraction of the beam relative to the oscillator output signal, whereby the acoustical image developed by the imaging means is a hologram.

13. The method of combined acoustical-optical microscopy comprising the steps of:

immersing an object within a fluid sonic preparation medium in close proximity to an elastically deformable partially light-reflective interface surface that reflects and transmits predetermined fractions of an impinging light beam, the sonic propagation medium contacting the interface surface;

scanning the object, through the interface surface, with a high energy light beam having a diameter of the order of ten microns or less;

insonifying the object, at a frequency of at least 100 MHz, to create a ripple pattern at the interface surface which is characteristic of the acoustic properties of the object, the ripple pattern angularly modulating the reflected fraction of the beam;

detecting the reflected and transmitted fractions of the beam;

and developing, from the detected beam fractions, inherently correlated simultaneous acoustical and optical images of the object.

14. The method of combined acoustical-optical microscopy, according to claim 13, in which image development is effected by means of at least one oscilloscopic image reproducer, and comprising the further step of scanning the image reproducer of in direct synchronism with the light beam scansion of the object.

15. The method of combined acoustical-optical microscopy, according to claim 13, in which insonification is effected at an acute angle to the normal to the interface surface.

* * * * *